US012603702B2

(12) United States Patent
Tanzi et al.

(10) Patent No.: US 12,603,702 B2
(45) Date of Patent: Apr. 14, 2026

(54) OPTICAL AMPLIFIER GAIN SELF-PROVISIONING

(71) Applicant: Cisco Technology, Inc., San Jose, CA (US)

(72) Inventors: Alberto Arnaldo Tanzi, Trezzano sul Naviglio (IT); Giovanni Osnago, La Valletta Brianza (IT); Maurizio Gazzola, Milan (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 286 days.

(21) Appl. No.: 18/466,901

(22) Filed: Sep. 14, 2023

(65) Prior Publication Data

US 2025/0096891 A1 Mar. 20, 2025

(51) Int. Cl.
*H04B 10/079* (2013.01)

(52) U.S. Cl.
CPC .............................. *H04B 10/07955* (2013.01)

(58) Field of Classification Search
CPC .......... H04B 10/07955; H04B 10/0777; H04B 10/0775; H04B 10/0795; H04B 10/07953; H04B 10/293; H04J 14/0221
See application file for complete search history.

(56) References Cited

U.S. PATENT DOCUMENTS

2007/0115538 A1* 5/2007 Charlet ................ H04B 10/296
359/334
2009/0092391 A1 4/2009 Zong et al.

2010/0091355 A1 4/2010 Ota
2010/0119223 A1* 5/2010 Ferrari ............... H04Q 11/0062
398/4
2019/0215091 A1 7/2019 Johansson
2023/0194779 A1* 6/2023 Chen .................... H04B 10/294
385/14

FOREIGN PATENT DOCUMENTS

CN 102045114 A 5/2011
CN 116112082 A 5/2023

OTHER PUBLICATIONS

Arista, "400ZR DCI Solution," Data Sheet, https://www.arista.com/assets/data/pdf/Datasheets/400ZR_DCI_Solution_Datasheet.pdf, Dec. 2022, 7 pages.

* cited by examiner

*Primary Examiner* — Hibret A Woldekidan
(74) *Attorney, Agent, or Firm* — Edell, Shapiro & Finnan, LLC

(57) ABSTRACT

An optical network element detects an input optical signal at a preamplifier input and sets an output power level of the preamplifier at a predetermined Automatic Power Reduction (APR) power level. The optical network element starts an APR timer that expires after a first predetermined time period. While the APR timer is running, the optical network element measures an input power level of the input optical signal and calculates a span loss as a function of the difference between the predetermined APR power level and the measured input power level. After the expiration of the APR timer, the optical network element adjusts the output power level of the preamplifier output based on the calculated span loss.

20 Claims, 9 Drawing Sheets

OPTICAL AMPLIFIER GAIN SELF-PROVISIONING

TECHNICAL FIELD

The present disclosure relates to optical computer networking, specifically initialization of optical links.

BACKGROUND

Optical networks typically use optical amplifiers to offset losses that arise from various elements in the optical path of the data signals. Network systems using Dense Wavelength-Division Multiplexing (DWDM) may implement optical gain regulation according to different processes and standards. The gain setting and regulation generally requires a communication channel between the nodes at the edge of an optical span to coordinate the gain between a booster amplifier at the output of a transmitting node and a preamplifier at the input of the receiving node. In other systems, the gain of one or both optical amplifiers may be based on assumptions of commonly fixed components, such as multiplexers, and may not adapt to the specific components of a deployed optical network system.

DETAILED DESCRIPTION

Overview

Figure 1:
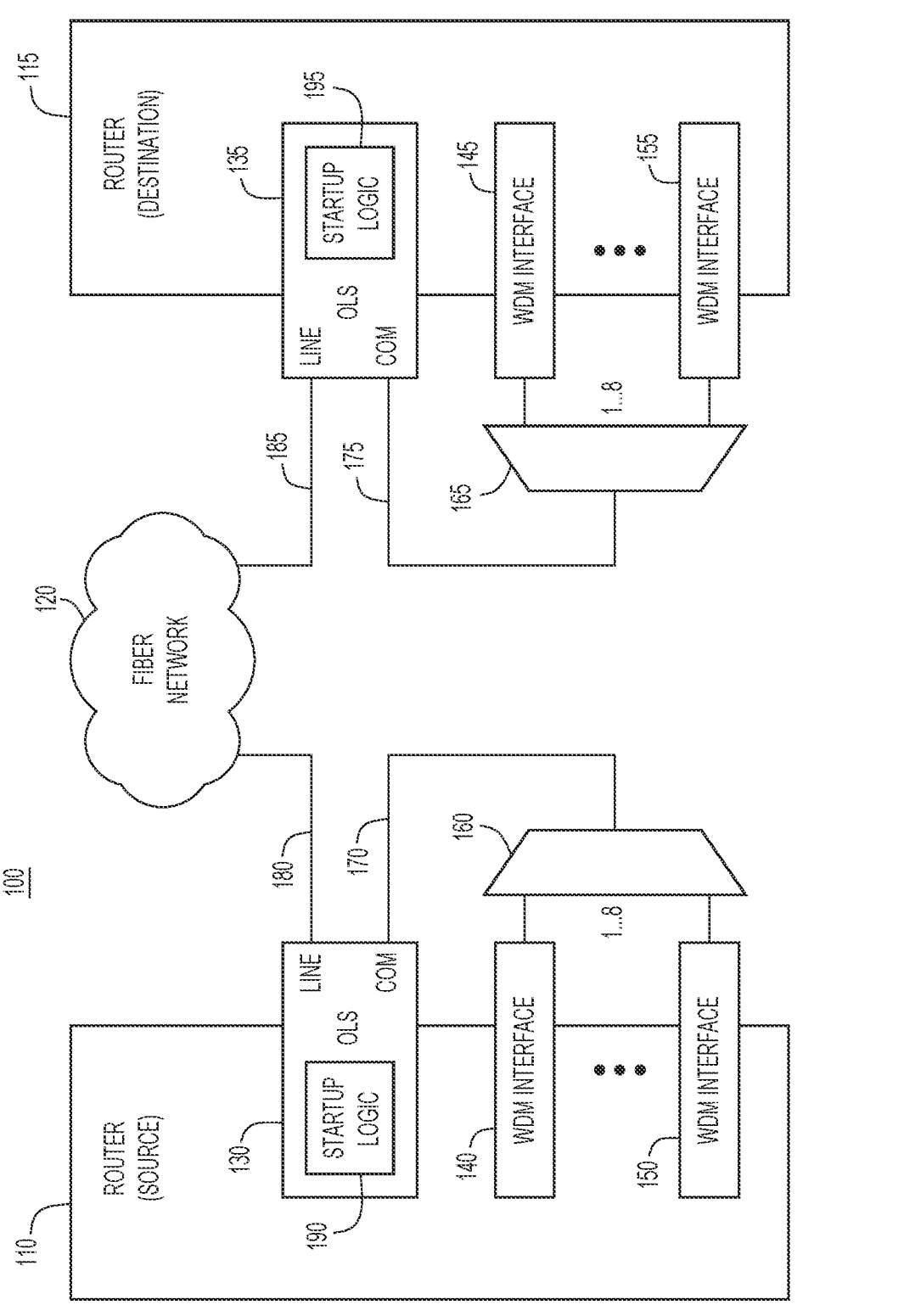
FIG. 1 is a block diagram of an optical network system configured to automatically provision optical amplifiers before a direct communication channel is available, according to an example embodiment.

A computer-implemented method is provided for autonomously provisioning a preamplifier for an optical network element. The method includes detecting an input optical signal at a preamplifier input of the optical network element.

The method also includes setting an output power level of an output optical signal at a predetermined Automatic Power Reduction (APR) power level. The output optical signal is generated at a preamplifier output of the optical network element. The method further includes starting an APR timer that expires after a first predetermined time period. The method also includes measuring an input power level of the input optical signal and calculating a span loss as a function of a difference between the predetermined APR power level and the measured input power level. After the expiration of the APR timer, the method includes adjusting the output power level of the output optical signal based on the span loss.

EXAMPLE EMBODIMENTS

A pluggable optical amplifier provides an optical network system with a simple means for routing a Point-To-Point (P2P) Wavelength-Division Multiplexing (WDM) connection without an external WDM transport platform. Typically, the gain of the optical amplifier would be manually set based on the individual deployment details, such as the span loss of fiber connections and/or insertion losses from an add/drop stage. As network deployments scale up to larger number of nodes, network operators prefer automation in the installation and configuration of network equipment to avoid manual steps and the potential for human errors. The techniques presented herein provide for automatic setting of optical gain in optical amplifiers (e.g., pluggable optical line systems) that does not require a communication channel between nodes in a P2P link.

The optical line system regulates the gain of the receiving amplifier (e.g., a preamplifier) according to the optical attenuation (i.e., the span loss) of the upstream link, which may vary based on the conditions of the network deployment. Typically, a destination node would receive an indication of the transmission power of the source node through a service channel to enable the destination node to determine the span loss. Without an established communications channel (e.g., a service channel) between the source node and the destination node, the destination node follows a specific start-up sequence according to the techniques described herein, which allows the destination node to determine the span loss without specific information from the source node. Based on the autonomously determined span loss, the destination node sets the gain of the preamplifier to offset the specific span loss of the optical link.

Additionally, a source node may include a start-up process that leverages the measurement of a transmitting channel feeding a multiplexer element to determine the insertion loss of the multiplexer element. The source node may adjust the gain of a booster amplifier to compensate for the insertion loss before transmitting the optical signal to the destination node.

By following the predefined start-up process described herein, an optical amplifier module in each node of the optical network system may autonomously determine gain settings for a preamplifier and/or a booster amplifier. The gain settings are specific to the network deployment, and may complement or replace manual initialization and configuration procedures.

Referring now to FIG. 1, an optical network system 100 is shown that enables an automatic initialization of an optical link between an optical network element 110 (e.g., a source node/router) and an optical network element 115 (e.g., a destination node/router). The optical network system may route the link between the optical network element 110 and the optical network element 115 through a fiber network 120. The fiber network 120 may include one or more fiber links to carry optical signals between the optical network element 110 and the optical network element 115.

The optical network element 110 includes an Optical Line System (OLS) 130 that is configured to interface with the fiber network 120. In one example, the OLS 130 may be a pluggable optical amplifier module, such as a Quad Small Form Factor (QFSP) Double Density (QDD) module. The optical network element 115 includes a similar OLS 135 that is configured to interface with the fiber network 120.

The optical network element 110 also includes a plurality of WDM interfaces (e.g., WDM interface 140 and WDM interface 150) that are configured to transmit/receive optical signals for network elements and/or endpoints (not shown) connected to the optical network element 110. The plurality of WDM interfaces of the optical network element 110 connect to a multiplexing element 160 that collects/distributes the signals from/to the plurality of WDM interfaces via an optical link 170. The OLS 130 connects to the fiber network 120 via an optical link 180. The OLS 130 also includes startup logic 190 that enables the OLS 130 to perform the initialization sequence described herein.

Similarly, the optical network element 115 includes a plurality of WDM interfaces (e.g., WDM interface 145 and WDM interface 155) that are configured to transmit/receive optical signals for network elements and/or endpoints (not shown) connected to the optical network element 115. The plurality of WDM interfaces of the optical network element 115 connect to a multiplexing element 165 that collects/distributes the signals from the plurality of WDM interfaces via an optical link 175. The OLS 135 connects to the fiber network 120 via an optical link 185. The OLS 135 also includes startup logic 195 that enables the OLS 135 to perform the initialization sequence described herein.

In one example, the cables of the optical links 170, 175, 180, and 185 may be terminated with connectors conforming to various standards, such as Subscriber Connector (SC), Lucent Connector (LC), Ferrule Connector (FC), Straight Tip (ST), Multi-fiber Push On (MPO), and/or Very Small Form Factor (VSFF). The two ends may be terminated with the same or different types of connectors. For instance, the optical links 180 and 185 may be LC-CS® cables and the optical links may be CS®-CS® cables. Similarly, the multiplexing elements 160 and 165 may connect to optical cable through connectors of different standards. For instance, the multiplexing elements 160 and 165 may connect to the WDM interfaces 140, 145, 150, or 155 via LC cables, but connect to the optical links 170 or 175 via a CS® cable. In another example, the WDM interfaces 140, 145, 150, and 155 may include pluggable transceiver modules in one or more form factor, such as QSFP, QDD, Octal Small Form Factor Pluggable (OSFP), and/or Compact Size Small Form Factor Pluggable (CSFP).

Figure 2:
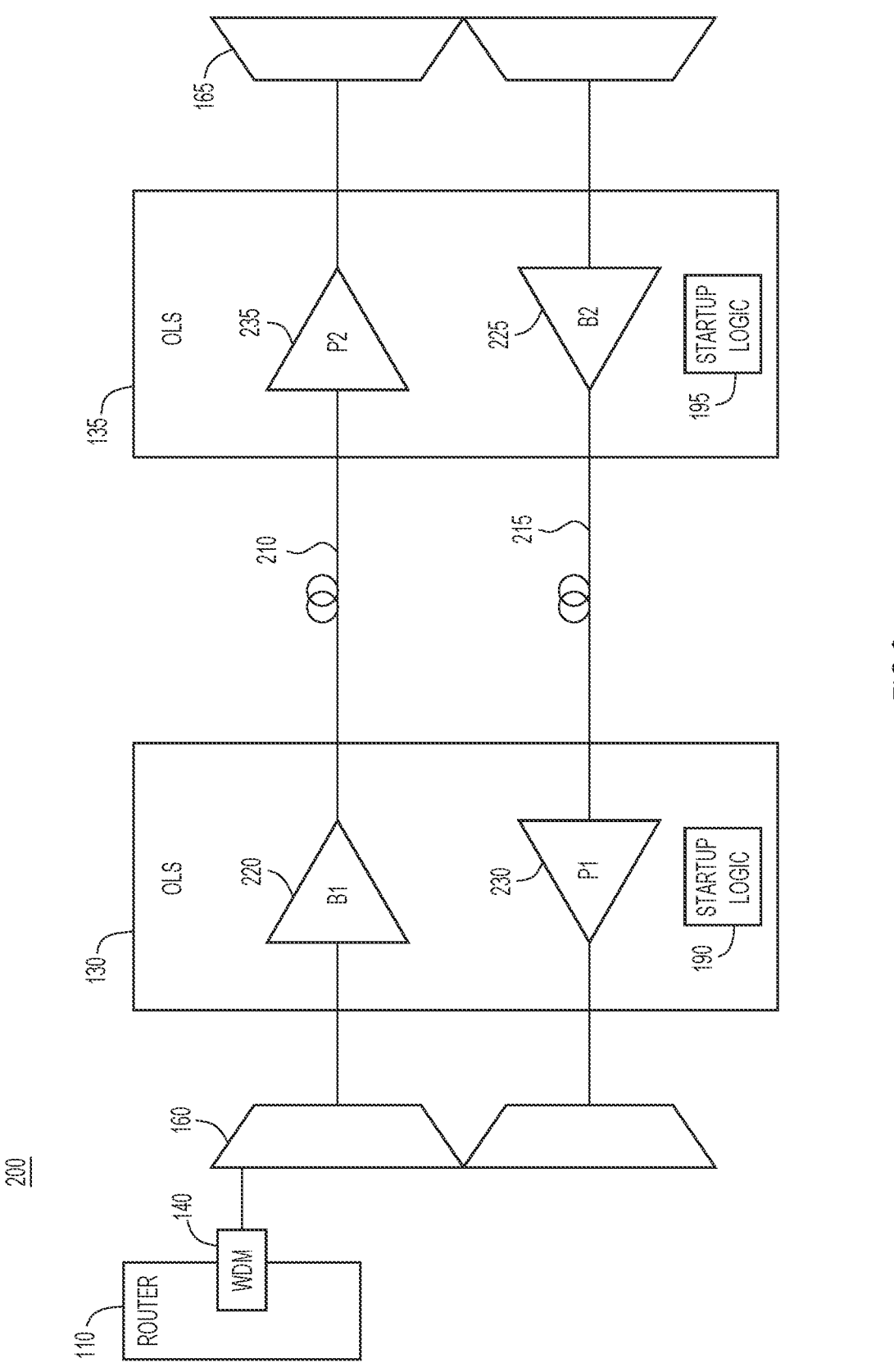
FIG. 2 is a simplified block diagram of the optical network system illustrating booster amplifiers and preamplifiers of an optical line system, according to an example embodiment.

Referring now to FIG. 2, a block diagram illustrates a network system 200 that illustrates the amplifier modules in the OLS 130 and the OLS 135, which compensate for losses in the optical path. The optical path 210 carries signals from the OLS 130 to the OLS 135 and may be a source of span loss. Similarly, the optical path 215 carries signals in the reverse direction as the optical path 210 (i.e., from the OLS 135 to the OLS 130). In one example, the optical paths 210 and 215 may include one or more optical links in the fiber network 120 shown in FIG. 1.

The OLS 130 and the OLS 135 include booster amplifiers 220 and 225, respectively, to amplify outgoing signals before sending the signals to the other OLS. In one example, the settings (e.g., gain, output power, etc.) of the booster amplifiers 220 and 225 (e.g., B1 and B2) are based on the local conditions of the local node. For instance, the booster amplifier 220 may be configured with settings that compensate for an insertion loss of the multiplexing element 160.

The OLS 130 and the OLS 135 also include preamplifiers 230 and 235, respectively, to amplify incoming signals from the other OLS. Contrary to the settings of the booster amplifiers 220 and 225, the settings of the preamplifiers 230 and 235 depend on conditions external to the local node, such as the span loss of the optical paths 210 and 215. In one example, the OLS 130 sets the gain of the preamplifier 230 as a function of the loss in the optical path 215 to compensate for the span loss. Similarly, the OLS 135 sets the gain of the preamplifier 235 as a function of the loss in the optical path 210 to compensate for the span loss.

The network system 200 shows two nodes connected by a single span for simplicity and clarity of explanation. In other examples, the techniques presented herein may be applied similarly to multi-hop links between optical network nodes.

In one example, the startup logic 190 may implement software/firmware for applying Finite State Machines (FSMs) that autonomously configure the booster amplifier 220 and the preamplifier 230. Similarly, the startup logic 195 may implement software/firmware for applying FSMs that autonomously configure the booster amplifier 225 and the preamplifier 235. In other words, the FSMs implemented by the startup logic 190 and the startup logic 195 operate only on the basis of locally measured signals.

In another example, the operational gain setpoint for the booster amplifier 220 may be determined to offset the insertion loss of the multiplexing element 160. To calculate the insertion loss of the multiplexer element, the optical network element may turn on a single WDM interface 140 and measure the output power of the module in the WDM interface 140. Additionally, the optical network element may measure the input power of the booster amplifier 220. The insertion loss of the multiplexing element 160 may be calculated based on the difference between the measured output power level of the WDM interface 140 and the input power level of the booster amplifier 220. The gain setpoint of the booster amplifier 220 may be set to increase the operational output power level of the booster amplifier 220 to the output power level of the WDM interface 140.

Figure 3:
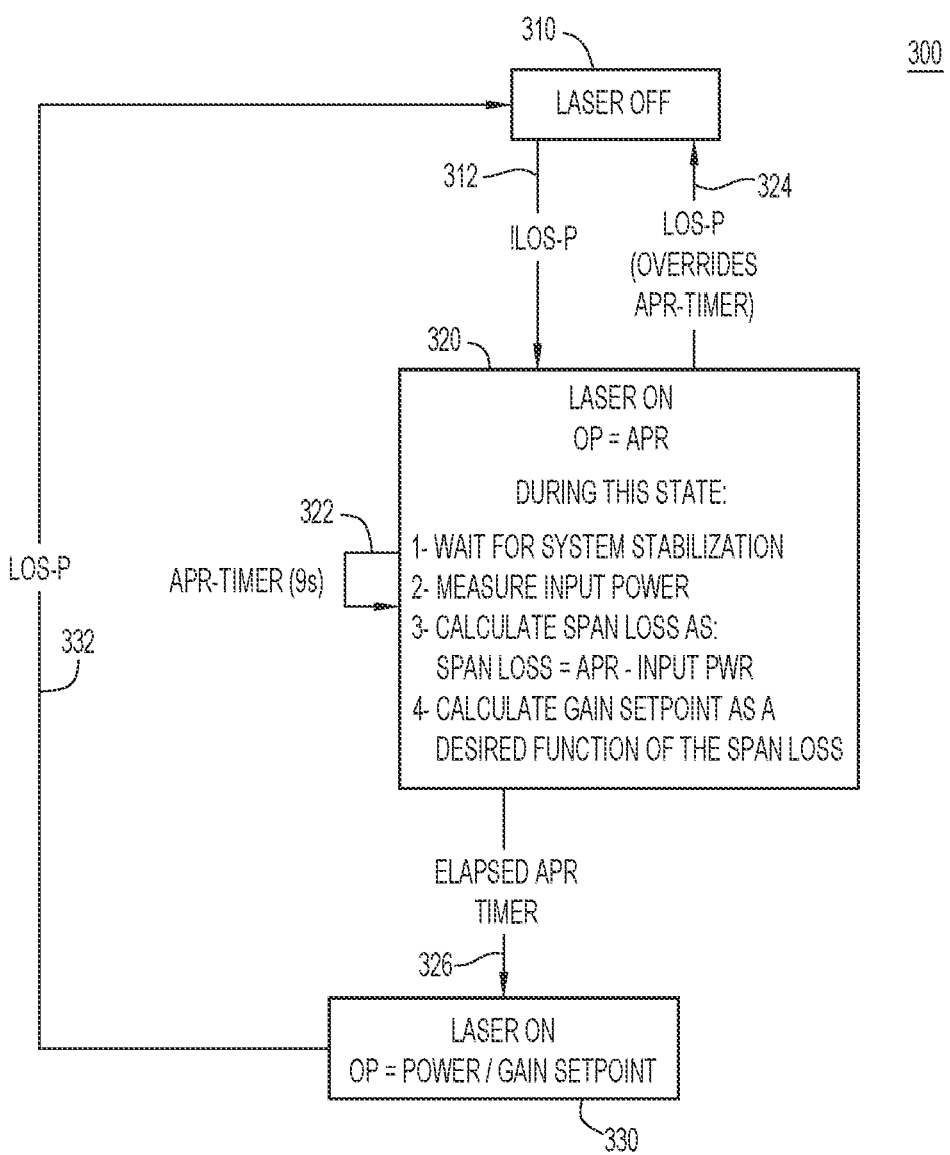
FIG. 3 illustrates a finite state machine for a pre-amplifier of an optical line system, according to an example embodiment.

Referring now to FIG. 3, an FSM 300 describes how a preamplifier (e.g., preamplifier 235) of an optical network element (e.g., a destination node) transitions between laser output states. The FSM 300 includes an off state 310 in which the laser of the preamplifier is off. The preamplifier begins in the off state 310 when the preamplifier first receives operational power. When the preamplifier detects an input signal 312, which may also be described logically as clearing the Loss Of Signal of the Preamplifier (!LOS-P), then the preamplifier transitions to the initialization state 320.

In the initialization state 320, the preamplifier turns on the output laser to an Operational Power (OP) of a predetermined Automatic Power Reduction (APR) value and starts an APR timer 322 that runs for a predetermined time period (e.g., 9 seconds). In one example, the predetermined APR value of output power is restricted to an eye-safe value, e.g., below 10 dBm. After entering the initialization state 320 and turning on the laser output, the preamplifier may wait a predetermined time period (e.g., as determined by a stabilization timer that is shorter than the APR timer) for any transient in the system to dissipate and the system to stabilize. If the preamplifier loses the input signal, i.e., the preamplifier detects LOS-P 324, before the expiration of the APR timer 322, then the preamplifier returns to the off state 310 with the output laser off. The preamplifier may also reset the APR timer and the stabilization timer if it loses the input signal.

Once the system stabilizes, the optical network element measures the input power of the input signal for the preamplifier from the incoming optical link. Based on the measured input power and the known output power (i.e., the predetermined APR value), which is presumed to be the same for all of the nodes in the network deployment, the optical network element calculates the span loss for the incoming optical link. In an example in which power levels are measured in units of dBm, the span loss is determined by the difference between the output power level (e.g., the predetermined APR power level) and the measured input level. The optical network element may calculate a gain setpoint for the preamplifier that offsets the span loss of the optical link. In other words, the optical network element determines the final gain setpoint for the preamplifier as a function of the calculated span loss.

Once the APR timer 322 expires, as shown at 326, the preamplifier enters an operational state 330. In the operational state the optical network element sets the gain of the preamplifier to the value calculated in the initialization state 320. With the preamplifier gain set at the operational value, the preamplifier laser remains on unless the preamplifier loses the input signal, i.e., the preamplifier detects LOS-P 332. If the preamplifier detects the LOS-P 332, then the preamplifier transitions back to the off state 310. The initialization process of the FSM 300 may be repeated any time the preamplifier transitions through the off state 310.

In one example, the optical network element does not require any coordination with elements of any other network node, such as the source node, to perform the FSM 300 and set the gain of the preamplifier. Additionally, setting the gain of the preamplifier is independently determined from setting the gain of the booster amplifier on the same optical network element.

Figure 4:
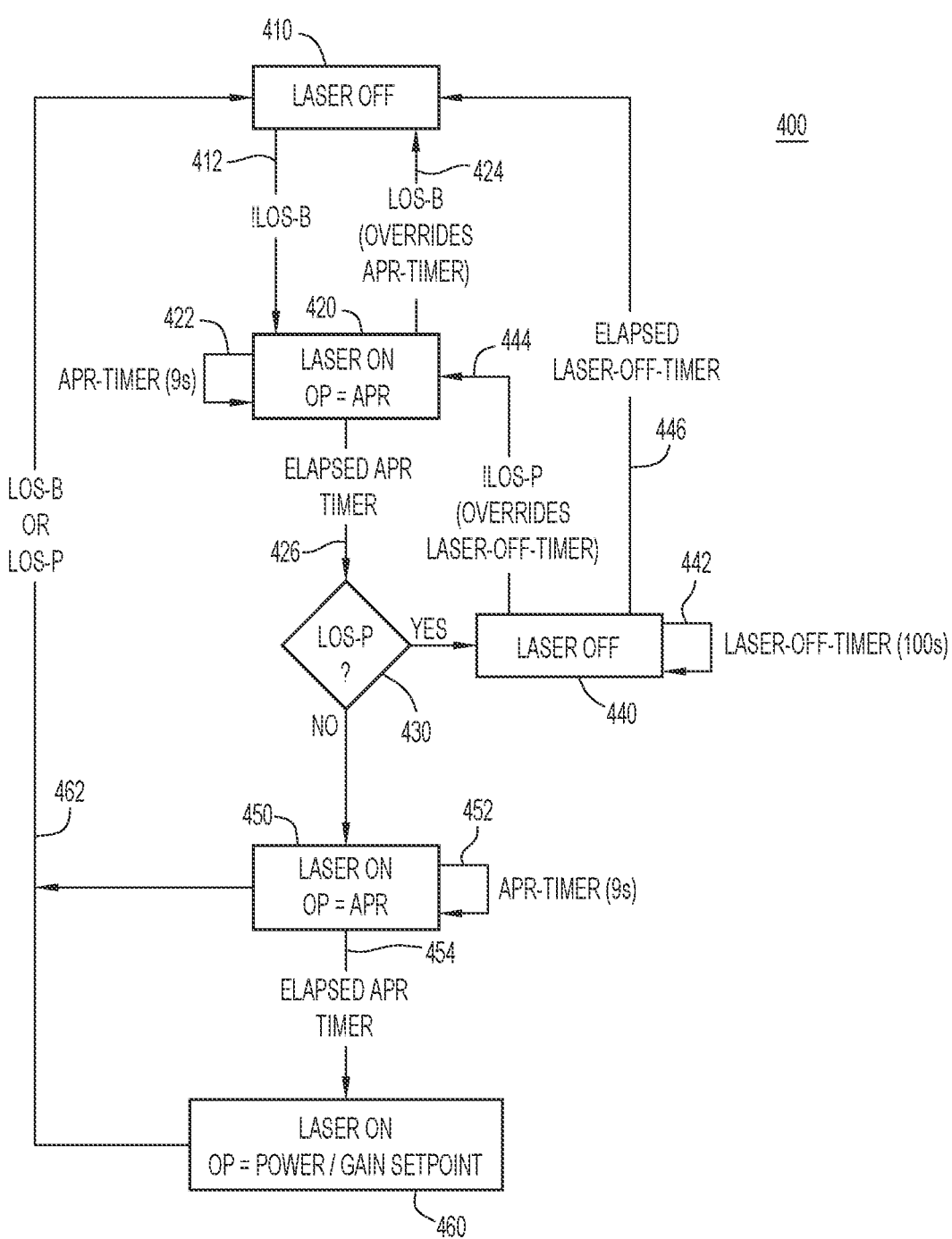
FIG. 4 illustrates a finite state machine for a booster amplifier of an optical line system, according to an example embodiment.

Referring now to FIG. 4, an FSM 300 describes how a booster amplifier (e.g., booster amplifier 220) of an optical network element (e.g., a source node) transitions between laser output states based on the inputs of both the booster amplifier (e.g., LOS-B) and the preamplifier (e.g., LOS-P). The FSM 400 includes an off state 410 in which the laser of the booster amplifier is off. The booster amplifier begins in the off state 410 when the booster amplifier first receives operational power. When the booster amplifier detects an input signal 412, which may also be described logically as clearing the Loss Of Signal of the Booster (!LOS-B), then the Booster amplifier transitions to the initialization state 420.

In the initialization state 420, the booster amplifier turns on the output laser to an Operational Power (OP) of a predetermined Automatic Power Reduction (APR) value and starts an APR timer 422 that runs for a predetermined length of time (e.g., 9 seconds). In one example, the predetermined APR value of output power is restricted to an eye-safe value, e.g., below 10 dBm. If the booster amplifier loses the input signal, i.e., the booster amplifier detects LOS-P 424, before the expiration of the APR timer 422, then the booster amplifier returns to the off state 410 with the output laser off.

Once the APR timer 422 expires, as shown at 426, the optical network element determines whether the preamplifier input signal is detected, i.e., whether the LOS-P is set or cleared, at 430. If the LOS-P is set, i.e., the preamplifier does not have an input signal, then the booster amplifier transitions to the off state 440 and start a laser-off timer 442. If the optical network element detects a preamplifier input signal (e.g., !LOS-P 444) before the laser-off timer 442 expires, then the FSM 400 returns to initialization state 420, turns on the laser of the booster amplifier to the predetermined APR power level, and restarts the APR timer 422. If the laser-off timer 442 expires, as shown at 446, then the FSM 400 returns to the off state 410 to restart the process.

In one example, the laser-off timer 442 causes the booster amplifier to generate multiple APR pulses that a destination node may use to calculate the span loss and adjust the gain setpoint of a preamplifier, as shown in the FSM 300 of FIG. 3, when the destination node comes online. By providing multiple distinct APR pulses rather than a constant power level, the optical network element may ensure compliance to optical safety guidelines for unrestricted locations.

If the optical network element fails to detect a preamplifier input signal at 430, i.e., LOS-P is not set, then the FSM 400 transitions to a second initialization state 450 with the booster amplifier output set at the predetermined APR power level and starts a second APR timer 452. The second initialization state 450 provides a destination node time to determine the appropriate gain setpoint for the destination preamplifier (e.g., via FSM 300 as shown in FIG. 3). In one example, the second initialization state 450 ensures stable input power conditions for the preamplifier at the destination node. Once the second APR timer 452 expires, as shown at 454, the FSM 400 transitions to the operational state 460 and sets the output power of the booster amplifier to the operational power (e.g., as described with respect to FIG. 2). If the optical network element loses the input signal for the preamplifier or the booster amplifier while in the operational state 460 or the second initialization state 450, as shown at 462, then the FSM 400 transitions back to the off state 410 and turns of the booster amplifier output.

Figure 5:
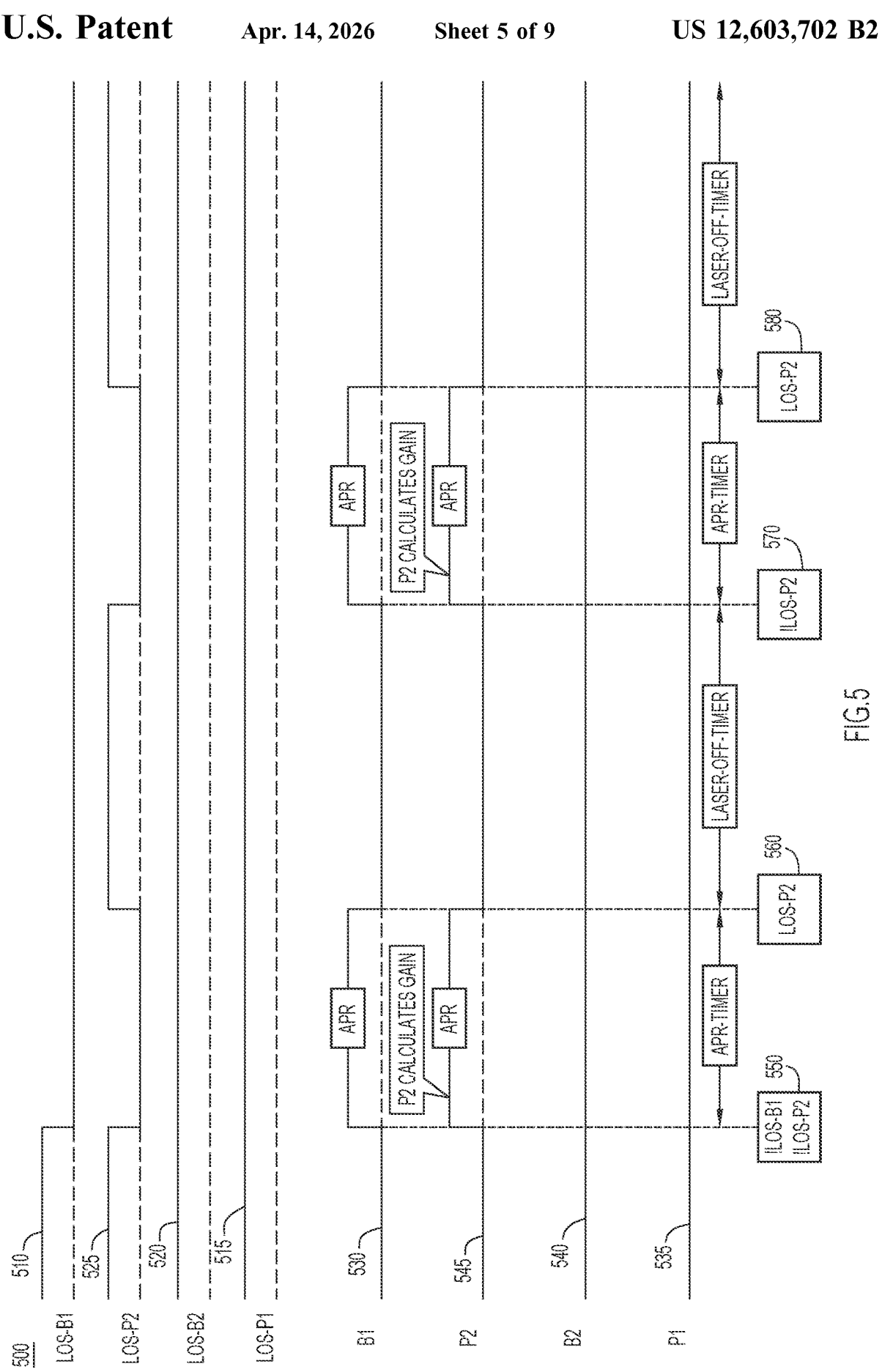
FIG. 5 illustrates the timing of a failed startup sequence between two optical network nodes, according to an example embodiment.

Referring now to FIG. 5, a timing diagram 500 illustrates an example of the interplay between the input/output of booster amplifiers and preamplifiers in two optical network elements. In this example, the booster amplifiers of the optical network elements provide an output signal that is received by the preamplifiers as input signals, as shown in FIG. 2. In other words, the output signal of the booster amplifier of the first optical network element traverses the optical link between the two optical network elements and leads to an input signal for the preamplifier of the second optical network element.

The logic signal 510 (e.g., LOS-B1) illustrates whether the booster amplifier of the first optical network element has an input signal. When the logic signal 510 is high, the booster amplifier of the first optical network element does not have an input signal, and when the logic signal 510 is low, the booster amplifier of the first optical network element has an input signal. The logic signal 515 (e.g., LOS-P1) illustrates whether the preamplifier of the first optical network element has an input signal. When the logic signal 515 is high, the preamplifier of the first optical network element does not have an input signal, and when the logic signal 515 is low, the preamplifier of the first optical network element has an input signal.

Similarly, the logic signal 520 (e.g., LOS-B2) illustrates whether the booster amplifier of the second optical network element has an input signal. When the logic signal 520 is high, the booster amplifier of the second optical network element does not have an input signal, and when the logic signal 520 is low, the booster amplifier of the second optical network element has an input signal. The logic signal 525 (e.g., LOS-P2) illustrates whether the preamplifier of the second optical network element has an input signal. When the logic signal 525 is high, the preamplifier of the second optical network element does not have an input signal, and when the logic signal 525 is low, the preamplifier of the second optical network element has an input signal.

The output signal 530 (e.g., B1) illustrates the power level of the output signal from the booster amplifier of the first optical network element. The output signal 535 (e.g., P1) illustrates the power level of the output signal from the preamplifier of the first optical network element. The output signal 540 (e.g., B2) illustrates the power level of the output signal from the booster amplifier of the second optical network element. The output signal 545 (e.g., P2) illustrates the power level from the preamplifier of the second optical network element.

In the example shown in FIG. 5, the first optical network element comes online first ready to initialize with the APR process described herein, but the second optical network element does not come online ready to transmit. For instance, the booster amplifier B2 of the second optical network element may not have input power and the logic signal 520 remains high indicated LOS-B2.

At time 550 (e.g., !LOS-B1, !LOS-P2), the booster amplifier of the first optical network element acquires an input signal, as shown by logic signal 510, and begins generating an output signal 530 at the predetermined APR power level. The output signal 530 is received as an input signal for the preamplifier of the second optical network element, as shown by logic signal 525. The preamplifier of the second optical network element calculates the gain setpoint to compensate for any losses in the optical link between the optical network elements and generates the output signal 545 at the predetermined APR power level.

At time 560 (e.g., LOS-P2), the APR timer of the first optical network element expires, and the booster amplifier of the first optical network element turns off the output signal 530 while the laser-off timer runs. Since the output signal 530 is turned off, the preamplifier of the second optical network element no longer receives an input signal, as shown by logic signal 525, and also stops providing the output signal 545.

At time 570 (e.g., !LOS-P2), the booster amplifier of the first optical network resumes generating the output signal 530, which causes an input signal at the preamplifier of the second optical network element, as shown in logic signal 525. The second optical network element repeats the gain setpoint calculation for the preamplifier and resumes generating the output signal 545 at the predetermined APR power level.

Figure 6:
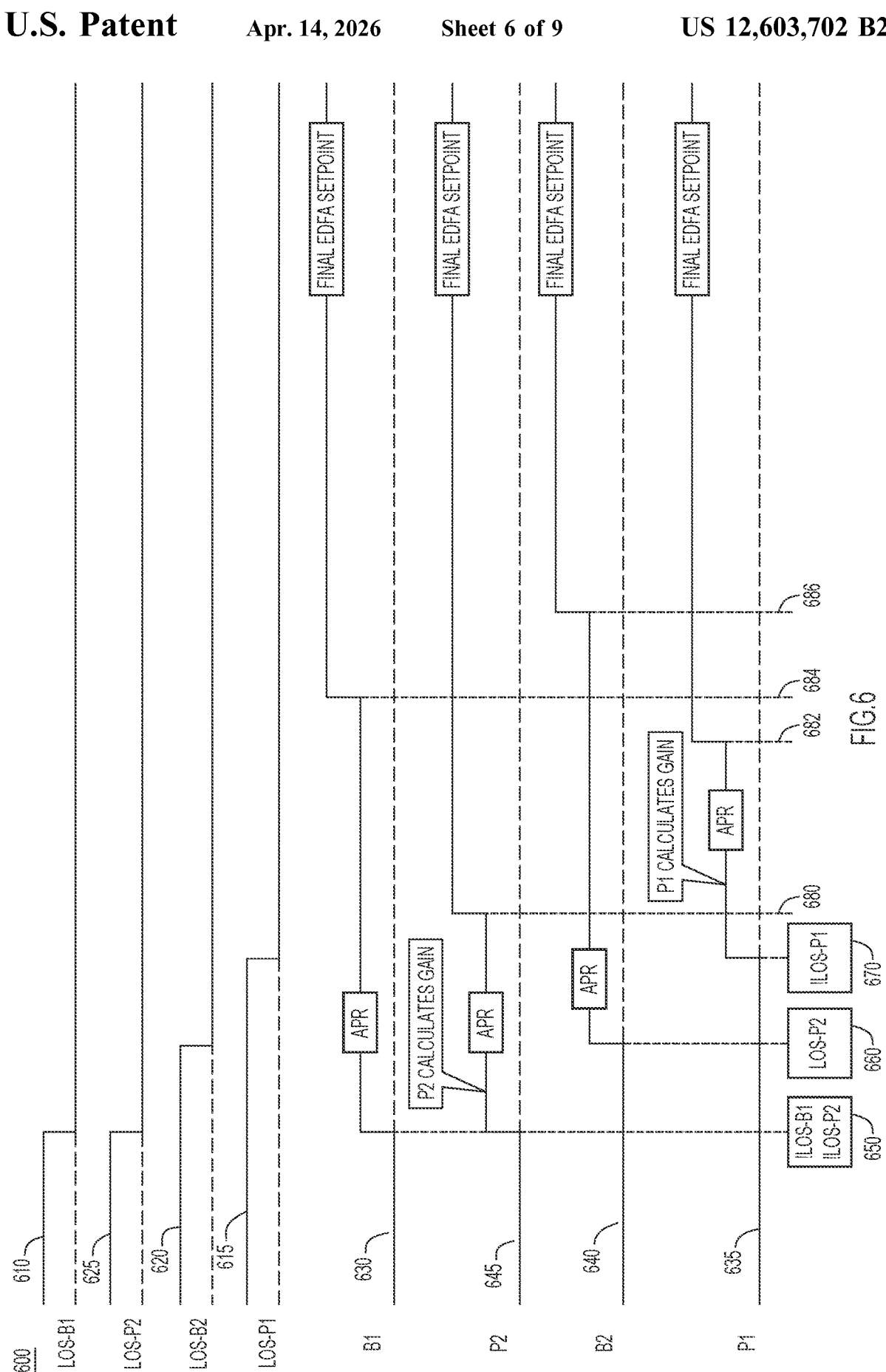
FIG. 6 illustrates the timing of a successful startup sequence between two optical network nodes, according to an example embodiment.

At time 580 (e.g., LOS-P2), the APR timer of the first optical network element expires again, and the booster amplifier of the first optical network element turns off the output signal 530 while the laser-off timer runs. Since the output signal 530 is turned off, the preamplifier of the second optical network element no longer receives an input signal, as shown by logic signal 525, and also stops providing the output signal 545. In one example, the booster amplifier of the first optical network and the preamplifier of the second optical network element may repeat the APR initialization process until the booster amplifier of the second network element receives an input signal to complete the initialization process described herein, as shown in FIG. 6. Alternatively, the first optical network may cycle for a predetermined number of times or a predetermined length of time before determining that the connection with the second optical network element is not likely to be automatically provisioned and notifying network administrators of the failure.

Referring now to FIG. 6, a timing diagram 600 illustrates an example of the interplay between the input/output of booster amplifiers and preamplifiers in two optical network elements during a successfully provisioned connection. In this example, the booster amplifiers of the optical network elements provide an output signal that is received by the preamplifiers as input signals, as shown in FIG. 2. In other words, the output signal of the booster amplifier of the first optical network element traverses the optical link between the two optical network elements and leads to an input signal for the preamplifier of the second optical network element.

The logic signal 610 (e.g., LOS-B1) illustrates whether the booster amplifier of the first optical network element has an input signal. When the logic signal 610 is high, the booster amplifier of the first optical network element does not have an input signal, and when the logic signal 610 is low, the booster amplifier of the first optical network element has an input signal. The logic signal 615 (e.g., LOS-P1) illustrates whether the preamplifier of the first optical network element has an input signal. When the logic signal 615 is high, the preamplifier of the first optical network element does not have an input signal, and when the logic signal 615 is low, the preamplifier of the first optical network element has an input signal.

Similarly, the logic signal 620 (e.g., LOS-B2) illustrates whether the booster amplifier of the second optical network element has an input signal. When the logic signal 620 is high, the booster amplifier of the second optical network element does not have an input signal, and when the logic signal 620 is low, the booster amplifier of the second optical network element has an input signal. The logic signal 625 (e.g., LOS-P2) illustrates whether the preamplifier of the second optical network element has an input signal. When the logic signal 625 is high, the preamplifier of the second optical network element does not have an input signal, and when the logic signal 625 is low, the preamplifier of the second optical network element has an input signal.

The output signal 630 (e.g., B1) illustrates the power level of the output signal from the booster amplifier of the first optical network element. The output signal 635 (e.g., P1) illustrates the power level of the output signal from the preamplifier of the first optical network element. The output signal 640 (e.g., B2) illustrates the power level of the output signal from the booster amplifier of the second optical network element. The output signal 645 (e.g., P2) illustrates the power level from the preamplifier of the second optical network element.

In the example shown in FIG. 6, the first optical network element comes online first at time 650, with the booster amplifier having an input signal, as shown by logic signal 610. The booster amplifier of the first optical network element begins to transmit the output signal 630, and the preamplifier of the second optical network element detects the input signal, as shown by logic signal 625. The second optical network element calculates the appropriate gain setpoint for the preamplifier and generates the output signal 645 at the predetermined APR power level.

At time 660, the booster amplifier of the second optical network element acquires an input signal, as shown by logic signal 620, and begins to generate the output signal 640 at the predetermined APR power level. In the example of FIG. 6, the output signal 640 from the booster amplifier of the second optical network element is not received by the preamplifier of the first optical network element. For instance, the optical link from the second optical network element to the first optical network element may be severed.

At time 670, the preamplifier of the first optical network element begins receiving an input signal, as shown by logic signal 615, and the preamplifier generates the output signal 635 at the predetermined APR power level. Based on the predetermined APR power level and the power level of the input signal received at the preamplifier of the first optical network element, the first optical network element calculates the gain setpoint for the preamplifier as described herein.

The second optical network element begins to transition to an operational state when the APR timer of preamplifier expires at time 680, since the preamplifier and the booster amplifier both have valid input signals. Similarly, the first optical network element begins to transition to an operational state when the APR timer of the preamplifier expires at time 682. After time 682, the preamplifiers of both the first optical network element and the second network element are configured with corresponding gain setpoints that are based on the span loss of the respective optical links.

The booster amplifier of the second optical network element transitions to an operational power level (e.g., based on compensating for an insertion loss of a multiplexer element) at time 684 after the first optical network element has been provided with the predetermined APR power level for a sufficient length of time (e.g., running the APR timer twice) for the first optical network element to calculate the gain setpoint for its preamplifier. Similarly, the booster amplifier of the first optical network element transitions to an operational power level at time 686 after the second optical network element has been provided with the predetermined APR power level for a sufficient length of time. After time 686, the first optical network element and the second optical network element are configured to communicate bidirectionally with autonomously provisioned preamplifiers that compensate for the span loss in the respective optical links between the two optical network elements.

Figure 7:
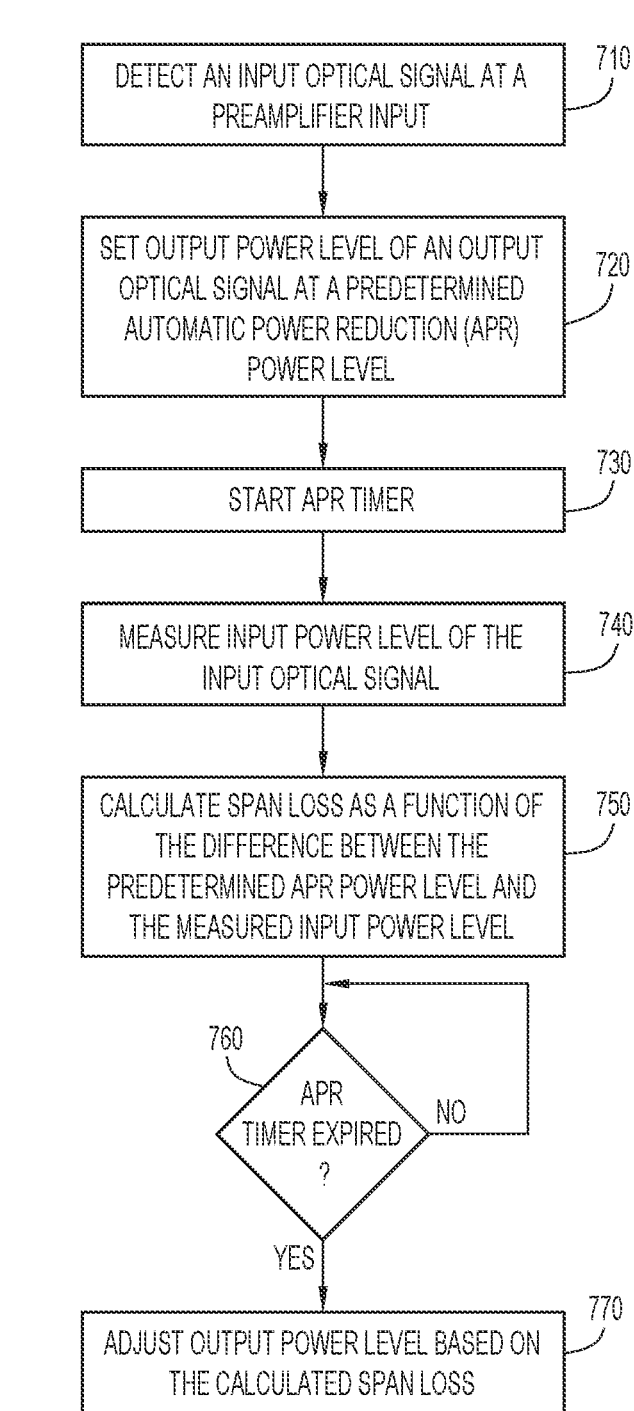
FIG. 7 is a flowchart illustrating operations performed by an optical line system to automatically set a preamplifier gain to compensate for span loss in received optical signals, according to an example embodiment.

Referring now to FIG. 7, a flowchart illustrates an example process 700 performed by an optical network element (e.g., OLS 130) to autonomously configure a preamplifier (e.g., preamplifier 230) with a gain setpoint. At 710, the optical network element detects an input optical signal at a preamplifier input. In one example, the input optical signal is received from a second optical network element that is connected to the optical network element via an optical link.

At 720, the optical network element sets the output power level of an output optical signal at a predetermined APR power level. In one example, the predetermined APR power level is an eye-safe level (e.g., below 10 dBm). At 730, the optical network element starts an APR timer. In one example, the APR timer is long enough (e.g., ten seconds) to complete the autonomous provisioning procedure on both optical network elements.

At 740, the optical network element measures the input power level of the input optical signal. In one example, the input optical signal is attenuated below the predetermined APR power level due to the span loss in the optical from the second optical network element. At 750, the optical network element calculates the span loss of the optical link from the second optical network element as a function of the difference between the predetermined APR power level and the measured input power level. In one example, the span loss is calculated as the difference between the predetermined APR power level and the input power level measured in dBm.

Once the APR timer expires, as determined at 760, then the optical network element adjusts the output power level of the preamplifier based on the calculated span loss at 770. In one example, the optical network element may determine a gain setpoint for the preamplifier as a function of the span loss to compensate for the span loss in received signals from the second optical network element.

Figure 8:
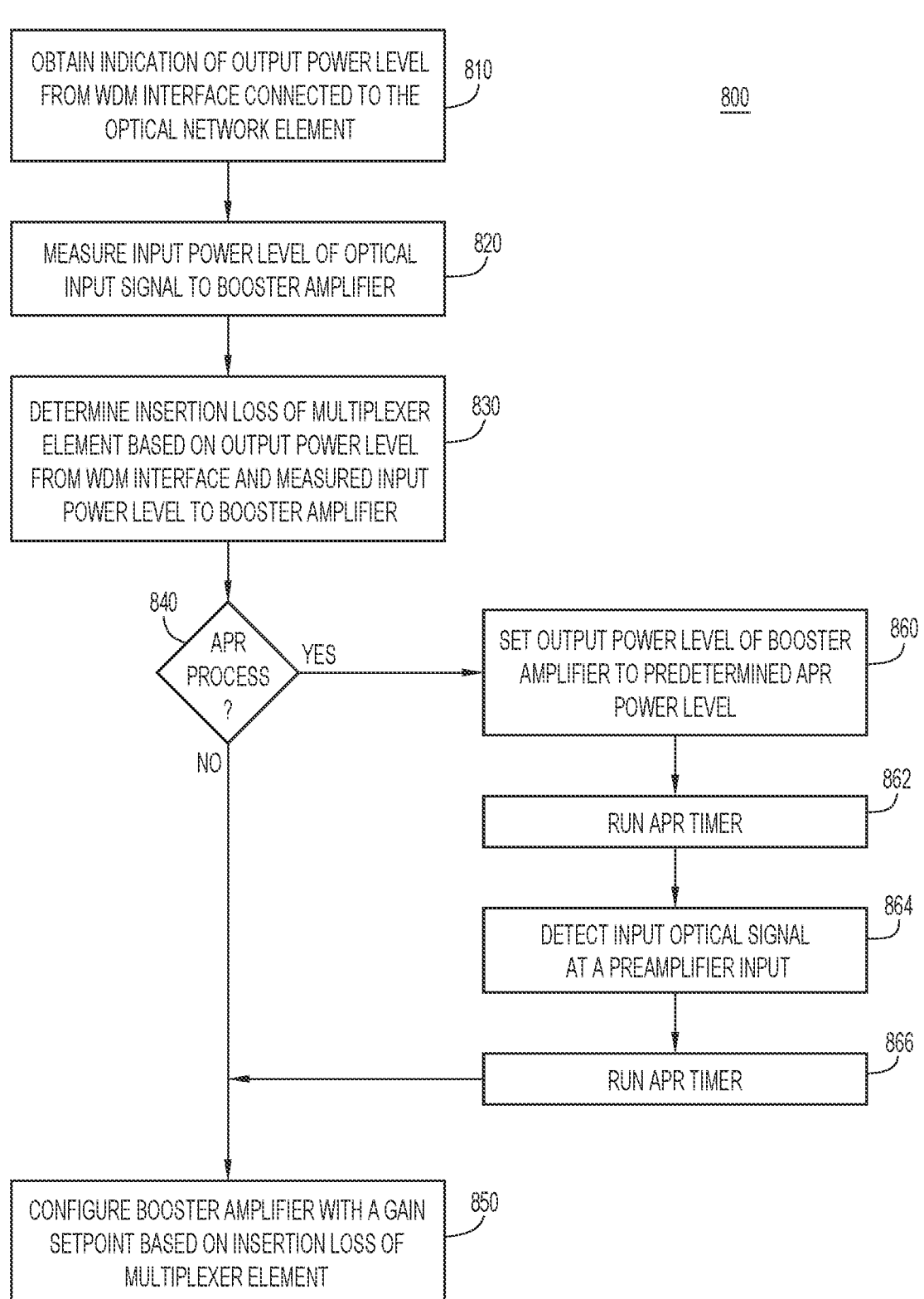
FIG. 8 is a flowchart illustrating operations performed by an optical line system to automatically set a booster amplifier gain to compensate for insertion loss from a multiplexer element of an optical network element, according to an example embodiment.

Referring now to FIG. 8, a flowchart illustrates an example process 800 performed by an optical network element (e.g., OLS 130) to configure a booster amplifier (e.g., booster amplifier 220) in an APR process. At 810, the optical network element obtains an indication of an output power level from a WDM interface connected to the optical network element. In one example, the WDM interface connects to the optical network element through a multiplexer element. In another example, the indication of the output power level may be a software measurement performed on behalf of the optical network element.

At 820, the optical network element measures an input power level of an optical input signal to the booster amplifier. In one example, the optical input signal may come from a single WDM connected to the optical network element through a multiplexer element. At 830, the optical network element determines an insertion loss of the multiplexer element based on the output power level of the WDM interface and the measured input power level to the booster amplifier. If the optical network element is configured to bypass the autonomous APR process, as determined at 840, then the optical network element may configure the booster amplifier with a gain setpoint based on the insertion loss of the multiplexer element at 850.

If the optical network element is configured for the APR process, as determined at 840, then the optical network element sets the output power level of the booster amplifier to the predetermined APR power level at 860. In one example, the predetermined APR power level is an eye-safe level (e.g., below 10 dBm). The optical network element runs a first APR timer at 862, and detects an input optical signal at a preamplifier input of the optical network element at 864. In one example, the optical network element may turn off the booster amplifier output if the optical network element does not detect input optical signal at the preamplifier input after the first APR timer expires. At 866, the optical network element runs a second APR timer to allow a remote optical network element sufficient time to run a corresponding APR process with a stable output at the predetermined APR power level. After the second APR timer expires, the optical network element returns to 850 and configured the booster amplifier with a gain setpoint based on the insertion loss of the multiplexer element.

Figure 9:
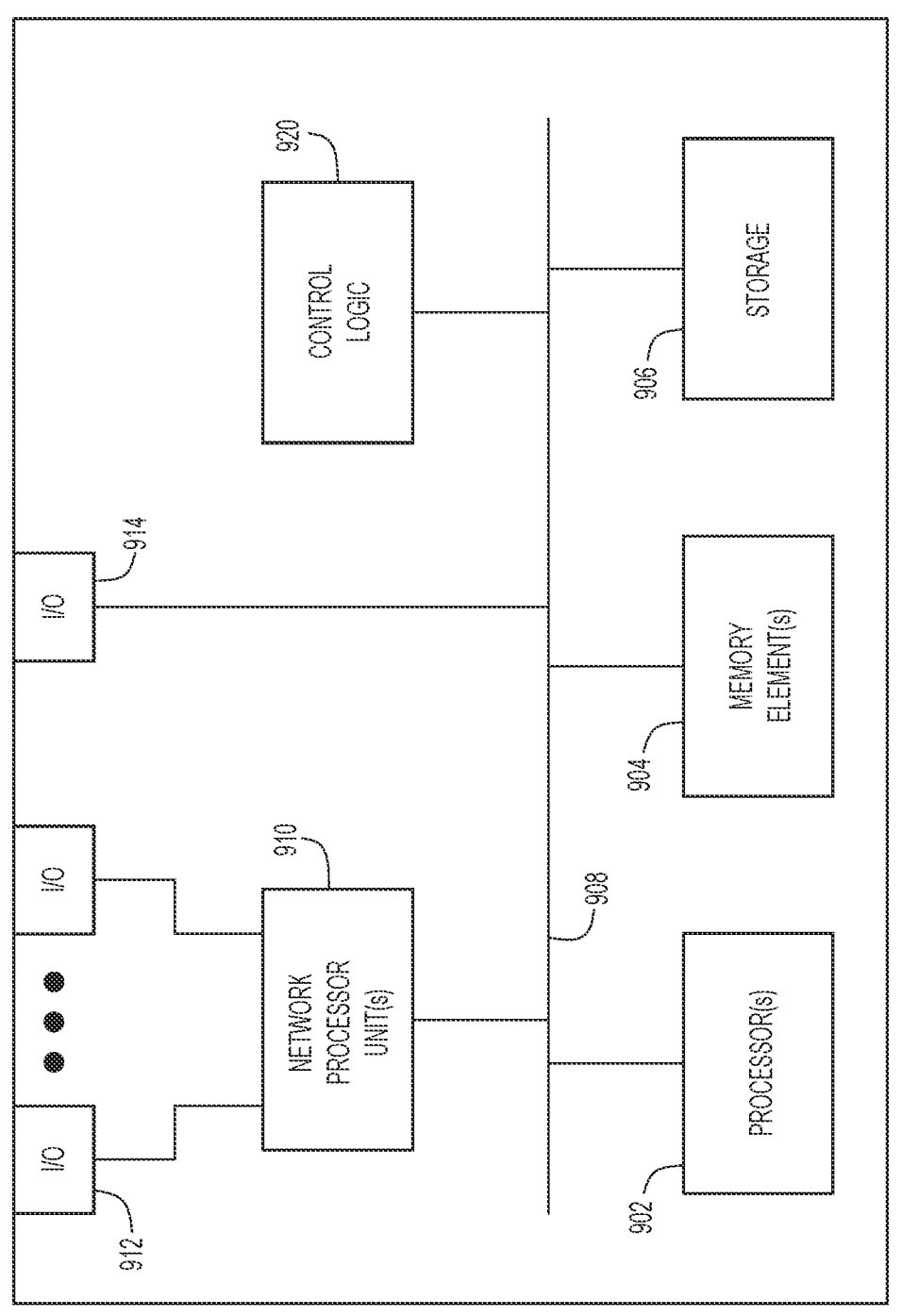
FIG. 9 is a block diagram of a computing device that may be configured to perform the techniques presented herein, according to an example embodiment.

Referring to FIG. 9, FIG. 9 illustrates a hardware block diagram of a computing device 900 that may perform functions associated with operations discussed herein in connection with the techniques depicted in FIGS. 1-8. In various embodiments, a computing device, such as computing device 900 or any combination of computing devices 900, may be configured as any entity/entities as discussed for the techniques depicted in connection with FIGS. 1-8 in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/ antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein provide for provisioning of two optical network nodes autonomously to automatically adjust for the span loss of specific optical links and the insertion loss of specific multiplexer elements. The autonomous provisioning provides a streamlined installation process without any user intervention, while improving the performance of optical line systems.

In some aspects, the techniques described herein relate to a method including: detecting an input optical signal at a preamplifier input of an optical network element; setting an output power level of an output optical signal at a predetermined Automatic Power Reduction (APR) power level, the output optical signal generated at a preamplifier output of the optical network element; starting an APR timer that expires after a first predetermined time period; measuring an input power level of the input optical signal; calculating a span loss as a function of a difference between the predetermined APR power level and the input power level; and after an expiration of the APR timer, adjusting the output power level of the output optical signal based on the span loss.

In some aspects, the techniques described herein relate to a method, further including: starting a stabilization timer that expires after a second predetermined time period, wherein the second predetermined time period is shorter than the first predetermined time period; and measuring the input power level of the input optical signal after an expiration of the stabilization timer.

In some aspects, the techniques described herein relate to a method, further including: detecting a loss of signal at the preamplifier input; and while the loss of signal at the preamplifier input is detected, turning off the output optical signal, resetting the APR timer, and resetting the stabilization timer.

In some aspects, the techniques described herein relate to a method, further including: detecting a loss of signal at the preamplifier input; and while the loss of signal at the preamplifier input is detected, turning off the output optical signal and resetting the APR timer.

In some aspects, the techniques described herein relate to a method, wherein adjusting the output power level includes adjusting a gain setpoint based on the span loss.

In some aspects, the techniques described herein relate to a method, wherein the predetermined APR power level is an eye-safe power level.

In some aspects, the techniques described herein relate to a method, further including setting an output power of a booster amplifier of the optical network element based on an insertion loss associated with a multiplexer connected to the booster amplifier.

In some aspects, the techniques described herein relate to an apparatus including: a preamplifier input configured to receive an input optical signal; a preamplifier output configured to generate an output optical signal; and a processor coupled to the preamplifier input and the preamplifier output, the processor configured to: detect the input optical signal at the preamplifier input; set the preamplifier output to generate the output optical signal at a predetermined Automatic Power Reduction (APR) power level; start an APR timer that expires after a first predetermined time period; measure an input power level of the input optical signal; calculate a span loss as a function of a difference between the predetermined APR power level and the input power level; and after an expiration of the APR timer, adjust an output power level of the output optical signal based on the span loss.

In some aspects, the techniques described herein relate to an apparatus, wherein the processor is further configured to: start a stabilization timer that expires after a second predetermined time period, wherein the second predetermined time period is shorter than the first predetermined time period; and measure the input power level of the input optical signal after an expiration of the stabilization timer.

In some aspects, the techniques described herein relate to an apparatus, wherein the processor is further configured to: detect a loss of signal at the preamplifier input; and while the loss of signal at the preamplifier input is detected, turn off the output optical signal, reset the APR timer, and reset the stabilization timer.

In some aspects, the techniques described herein relate to an apparatus, wherein the processor is further configured to: detect a loss of signal at the preamplifier input; and while the loss of signal at the preamplifier input is detected, turn off the output optical signal and reset the APR timer.

In some aspects, the techniques described herein relate to an apparatus, wherein the processor is configured to adjust the output power level by adjusting a gain setpoint for the apparatus based on the span loss.

In some aspects, the techniques described herein relate to an apparatus, wherein the processor is configured to set the predetermined APR power level at an eye-safe power level.

In some aspects, the techniques described herein relate to one or more non-transitory computer readable storage media encoded with software including computer executable instructions that, when the software is executed on optical network element, is operable to cause a processor of the optical network element to: detect an input optical signal at a preamplifier input of the optical network element; set an output power level of an output optical signal at a predetermined Automatic Power Reduction (APR) power level, the output optical signal generated at a preamplifier output of the optical network element; start an APR timer that expires after a first predetermined time period; measure an input power level of the input optical signal; calculate a span loss as a function of a difference between the predetermined APR power level and the input power level; and after an expiration of the APR timer, adjust the output power level of the output optical signal based on the span loss.

In some aspects, the techniques described herein relate to one or more non-transitory computer readable storage media, wherein the software is further operable to cause the processor to: start a stabilization timer that expires after a second predetermined time period, wherein the second predetermined time period is shorter than the first predetermined time period; and measure the input power level of the input optical signal after an expiration of the stabilization timer.

In some aspects, the techniques described herein relate to one or more non-transitory computer readable storage media, wherein the software is further operable to cause the processor to: detect a loss of signal at the preamplifier input; and while the loss of signal at the preamplifier input is detected, turn off the output optical signal, reset the APR timer, and reset the stabilization timer.

In some aspects, the techniques described herein relate to one or more non-transitory computer readable storage media, wherein the software is further operable to cause the processor to: detect a loss of signal at the preamplifier input;

and while the loss of signal at the preamplifier input is detected, turn off the output optical signal and reset the APR timer.

In some aspects, the techniques described herein relate to one or more non-transitory computer readable storage media, wherein the software is further operable to cause the processor to adjust the output power level includes adjusting a gain setpoint based on the span loss.

In some aspects, the techniques described herein relate to one or more non-transitory computer readable storage media, wherein the software is further operable to cause the processor to set the predetermined APR power level at an eye-safe power level.

In some aspects, the techniques described herein relate to one or more non-transitory computer readable storage media, wherein the software is further operable to cause the processor to set an output power of a booster amplifier of the optical network element based on an insertion loss associated with a multiplexer connected to the booster amplifier.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   detecting an input optical signal at a preamplifier input of an optical network element;
   setting an output power level of an output optical signal at a predetermined Automatic Power Reduction (APR) power level, the output optical signal generated at a preamplifier output of the optical network element;
   starting an APR timer that expires after a first predetermined time period;
   after a reset of the APR timer or after an expiration of the APR timer, measuring an input power level of the input optical signal and calculating a span loss as a function of a difference between the predetermined APR power level and the input power level; and
   adjusting the output power level of the output optical signal to compensate for the span loss.

2. The method of claim 1, further comprising:
   starting a stabilization timer that expires after a second predetermined time period, wherein the second predetermined time period is shorter than the first predetermined time period; and
   measuring the input power level of the input optical signal after an expiration of the stabilization timer.

3. The method of claim 2, further comprising:
   detecting a loss of signal at the preamplifier input; and
   while the loss of signal at the preamplifier input is detected, turning off the output optical signal, resetting the APR timer, and resetting the stabilization timer.

4. The method of claim 1, further comprising:
   detecting a loss of signal at the preamplifier input; and
   while the loss of signal at the preamplifier input is detected, turning off the output optical signal and resetting the APR timer.

5. The method of claim 1, wherein adjusting the output power level comprises adjusting a gain setpoint to compensate for the span loss.

6. The method of claim 1, wherein the predetermined APR power level is an eye-safe power level.

7. The method of claim 1, further comprising setting an output power of a booster amplifier of the optical network element based on an insertion loss associated with a multiplexer connected to the booster amplifier.

8. An apparatus comprising:
   a preamplifier input configured to receive an input optical signal;
   a preamplifier output configured to generate an output optical signal; and
   a processor coupled to the preamplifier input and the preamplifier output, the processor configured to:
      detect the input optical signal at the preamplifier input;
      set the preamplifier output to generate the output optical signal at a predetermined Automatic Power Reduction (APR) power level;
      start an APR timer that expires after a first predetermined time period;
      after a reset of the APR timer or after an expiration of the APR timer, measure an input power level of the input optical signal and calculate a span loss as a function of a difference between the predetermined APR power level and the input power level; and
      adjust an output power level of the output optical signal to compensate for the span loss.

9. The apparatus of claim 8, wherein the processor is further configured to:
   start a stabilization timer that expires after a second predetermined time period, wherein the second predetermined time period is shorter than the first predetermined time period; and
   measure the input power level of the input optical signal after an expiration of the stabilization timer.

10. The apparatus of claim 9, wherein the processor is further configured to:
   detect a loss of signal at the preamplifier input; and
   while the loss of signal at the preamplifier input is detected, turn off the output optical signal, reset the APR timer, and reset the stabilization timer.

11. The apparatus of claim 8, wherein the processor is further configured to:
   detect a loss of signal at the preamplifier input; and
   while the loss of signal at the preamplifier input is detected, turn off the output optical signal and reset the APR timer.

12. The apparatus of claim 8, wherein the processor is configured to adjust the output power level by adjusting a gain setpoint for the apparatus to compensate for the span loss.

13. The apparatus of claim 8, wherein the processor is configured to set the predetermined APR power level at an eye-safe power level.

14. One or more non-transitory computer readable storage media encoded with software comprising computer executable instructions that, when the software is executed on optical network element, is operable to cause a processor of the optical network element to:

detect an input optical signal at a preamplifier input of the optical network element;

set an output power level of an output optical signal at a predetermined Automatic Power Reduction (APR) power level, the output optical signal generated at a preamplifier output of the optical network element;

start an APR timer that expires after a first predetermined time period;

after a reset of the APR timer or after an expiration of the APR timer measure an input power level of the input optical signal and calculate a span loss as a function of a difference between the predetermined APR power level and the input power level; and adjust the output power level of the output optical signal to compensate for the span loss.

15. The one or more non-transitory computer readable storage media of claim 14, wherein the software is further operable to cause the processor to:

start a stabilization timer that expires after a second predetermined time period, wherein the second predetermined time period is shorter than the first predetermined time period; and measure the input power level of the input optical signal after an expiration of the stabilization timer.

16. The one or more non-transitory computer readable storage media of claim 15, wherein the software is further operable to cause the processor to:

detect a loss of signal at the preamplifier input; and while the loss of signal at the preamplifier input is detected, turn off the output optical signal, reset the APR timer, and reset the stabilization timer.

17. The one or more non-transitory computer readable storage media of claim 14, wherein the software is further operable to cause the processor to:

detect a loss of signal at the preamplifier input; and while the loss of signal at the preamplifier input is detected, turn off the output optical signal and reset the APR timer.

18. The one or more non-transitory computer readable storage media of claim 14, wherein the software is further operable to cause the processor to adjust the output power level comprises adjusting a gain setpoint to compensate for the span loss.

19. The one or more non-transitory computer readable storage media of claim 14, wherein the software is further operable to cause the processor to set the predetermined APR power level at an eye-safe power level.

20. The one or more non-transitory computer readable storage media of claim 14, wherein the software is further operable to cause the processor to set an output power of a booster amplifier of the optical network element based on an insertion loss associated with a multiplexer connected to the booster amplifier.

\* \* \* \* \*